US005107259A

United States Patent [19]

Weitzen et al.

[11] Patent Number: 5,107,259

[45] Date of Patent: Apr. 21, 1992

[54] MEANS AND METHOD OF DISPLAYING A MESSAGE IN A PLURALITY OF SCRIPTS

[75] Inventors: Randi F. Weitzen, Boynton Beach; Mark T. Stair, Delray Beach; Patrick S. Kung, West Palm Beach, all of Fla.

[73] Assignee: Motorola, Inc., Schaumburg, Ill.

[21] Appl. No.: 364,733

[22] Filed: Jun. 12, 1989

[51] Int. Cl.[5] ..................... H04B 5/04

[52] U.S. Cl. ..................... 340/825.44; 340/731; 340/735

[58] Field of Search ............... 340/731, 735, 790, 721, 340/723, 825.44, 311.1

[56] References Cited

U.S. PATENT DOCUMENTS

| | | | |
|---|---|---|---|
| 4,429,306 | 1/1984 | Macauley et al. | 340/790 |
| 4,661,808 | 4/1987 | Rector et al. | 340/790 |
| 4,855,949 | 8/1989 | Garland et al. | 340/735 |
| 4,870,402 | 9/1989 | DeLuca et al. | 340/825.44 |

FOREIGN PATENT DOCUMENTS

| | | | |
|---|---|---|---|
| 0034710 | 3/1980 | Japan | 340/731 |
| 2146207 | 4/1985 | United Kingdom | 340/731 |
| 2206718 | 1/1989 | United Kingdom | 340/825.44 |

*Primary Examiner*—Donald J. Yusko
*Assistant Examiner*—John Giust
*Attorney, Agent, or Firm*—William E. Koch; Vincent B. Ingrassia; Anthony J. Sarli, Jr.

[57] ABSTRACT

A selective call receiver displays messages in at least two scripts. The selective call receiver receives data including an address and a message to be displayed. A decoder decodes the data and recognizes a script select character therewithin. A memory stores at least two fonts corresponding to said at least two scripts, said scripts having different resolutions. A microcomputer is coupled to the decoder and the memory for selecting one of the fonts in response to the script select character, and a display is coupled to the microcomputer for displaying the message in the selected font.

5 Claims, 7 Drawing Sheets

MEANS AND METHOD OF DISPLAYING A MESSAGE IN A PLURALITY OF SCRIPTS

BACKGROUND OF THE INVENTION

1. Field of the Invention

The present invention relates to communication systems and more particularly to a communication system capable of displaying messages comprising a plurality of different scripts.

2. Background Art

Communications systems in general and paging systems in particular using transmitted call signals have attained widespread use for calling selected receivers to transmit information from a base station transmitter to the receivers. Modern paging receivers have achieved multifunction capability through the use of microcomputers which allow the paging receiver to respond to information having various combinations of tone, tone and voice, or data messages. The information is transmitted using any number of paging coding schemes and message formats. The paging coding schemes typically are of the multi-character word length type where the character may be a binary digit or the like. Most prior art paging systems have been able to transmit and receive data message information in only one language, e.g. only in English or only in Japanese. The widespread use of paging systems now requires that data messages comprised of different languages be transmitted to a paging receiver for receiving and displaying the symbols of the languages to the paging receiver user. These languages include alphanumeric languages such as English, French, German or the like as well as ideographic languages such as Japanese, Chinese or the like.

In U.S. patent application Ser. No. 926,289, there is described a paging system in which both alphanumeric and ideographic languages may be displayed. However, the resolution of the display is limited to that conventionally used for alphanumeric languages. Such a display usually has 2 rows of 16 characters where each character is formed on a $5\times7$ dot matrix. Although a $5\times7$ dot matrix is sufficient for most alphanumeric languages, it has a somewhat limited resolution for most ideographic languages. The above mentioned patent describes the use of $5\times7$ dot matrices to display the Japanese Katakana script in a limited resolution. However, it cannot display the Kanji and Hiragana Japanese scripts which require greater resolution. Furthermore, it cannot be used to display Chinese which has a very large number of symbols comprising its language. There are over 3500 commonly used Chinese characters. In order to display such a large number of symbols, the resolution of the display must be increased. A suitable display for these scripts is a $16\times16$ or larger dot matrix display per character.

Naturally, alphanumeric scripts can also be displayed on such a display, however, it will be appreciated that in order to transmit such characters requires longer data words than for the smaller $5\times7$ characters. Indeed, where the $5\times7$ character requires 1 byte of information, a $16\times16$ character requires 2 bytes. Thus greater transmitting time is required for $16\times16$ characters.

In the operation of paging receivers, important factors involved in their successful operation include the portability of the receiver, the limited energy available for the receiver, the amount of memory available for the paging receiver's microcomputer, the limited availability of the radio spectrum, the fast response time required in today's active society and the number of paging receivers included in the paging system. In such paging receivers, in order that the drain on the battery be minimized, the paging receiver is systematically turned off and turned on to maximize the length of time energy is available from the batteries. The limited energy in which the paging receiver must operate limits the memory and minimizes the electronic circuitry such as the display in the paging receiver.

SUMMARY OF THE INVENTION

Accordingly, it is an object of the present invention to provide an improved selective call receiver.

Another object of the present invention is to provide a selective call receiver which can display messages in at least two scripts having different resolution.

It is a further object of the present invention to provide a radio receiver which can display alphanumeric languages in a low resolution font and an ideographic language in a high resolution font.

In carrying out the above and other objects of the invention in one form, there is provided a selective call receiver capable of displaying messages in at least two scripts. The selective call receiver receives data including an address and a message to be displayed. A decoder decodes the data and recognizes a script select character therewithin. A memory stores at least two fonts corresponding to said at least two scripts, said scripts having different resolutions. A microcomputer is coupled to the decoder and the memory for selecting one of the fonts in response to the script select character, and a display is coupled to the microcomputer for displaying the message in the selected font.

The above and other objects, features, and advantages of the present invention will be better understood from the following detailed description taken in conjunction with the accompanying drawings.

DETAILED DESCRIPTION OF THE INVENTION

Figure 1:
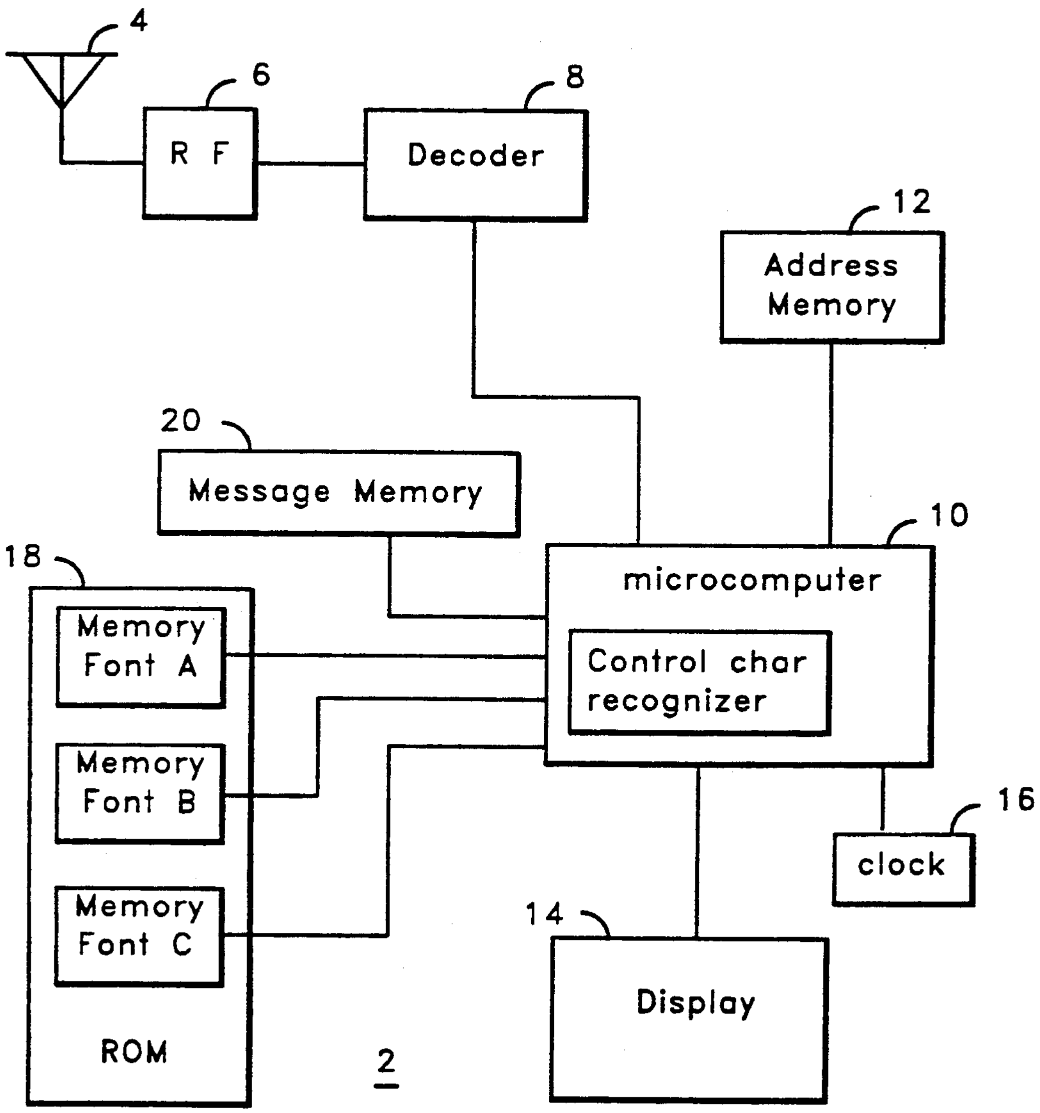
FIG. 1 illustrates a functional block diagram of a typical paging receiver according to the present invention.

Referring to FIG. 1, there is shown a functional block diagram of a paging receiver 2 adapted for the present invention. An antenna 4 is connected to a receiver module 6 which is connected to a decoder 8. The RF carrier signal is mixed with a local oscillator and an injection signal in the receiver module 6 generating a lower frequency IF signal suitable for processing by the decoder in a manner well known to one skilled in the art. The IF signal is fed to the decoder 8 which serves to convert the IF signal to the address and message data components of the original signal. The address and message data is applied to an input of a microcomputer 10. The microcomputer 10 compares the address data with predetermined addresses contained in address memory 12 to produce output signals to process the message data and to alert the user that a message has been received. One of the output signals from the microcomputer 10 is supplied to a dot matrix liquid crystal display module 14 to produce a display of the data message.

A clock signal, as derived from a sample clock 16, is applied to the microcomputer 10 to control the rate at which the receive signals are processed. It is understood that microcomputer 10, such as an MC68HC05C8 8-bit microcomputer manufactured by Motorola, Inc., uses clock 16, as is well known in the art, for controlling its internal operations as well as its interface with other elements of the paging receiver 2. The microcomputer 10 is coupled to a read only memory (ROM) 18 and to a random access memory (RAM) functioning as a message memory 20 to store the message decoded from the received signals from the base terminal.

The display 14 is a dot matrix liquid crystal display unit having 16×132 pixels. The ROM 18 stores two or more fonts providing information on which dots are to be energized for any particular character required. In a first mode of operation, Font A is an alphanumeric font of 5×7 characters. It will be clear that two rows of such characters will fit onto a display 16 segments high. Font B is an ideographic font of 16×16 characters. Thus, a received message can, in a first operating mode be displayed either in 16×16 ideographic characters or in 5×7 alphanumeric characters.

Figures 2, 4:
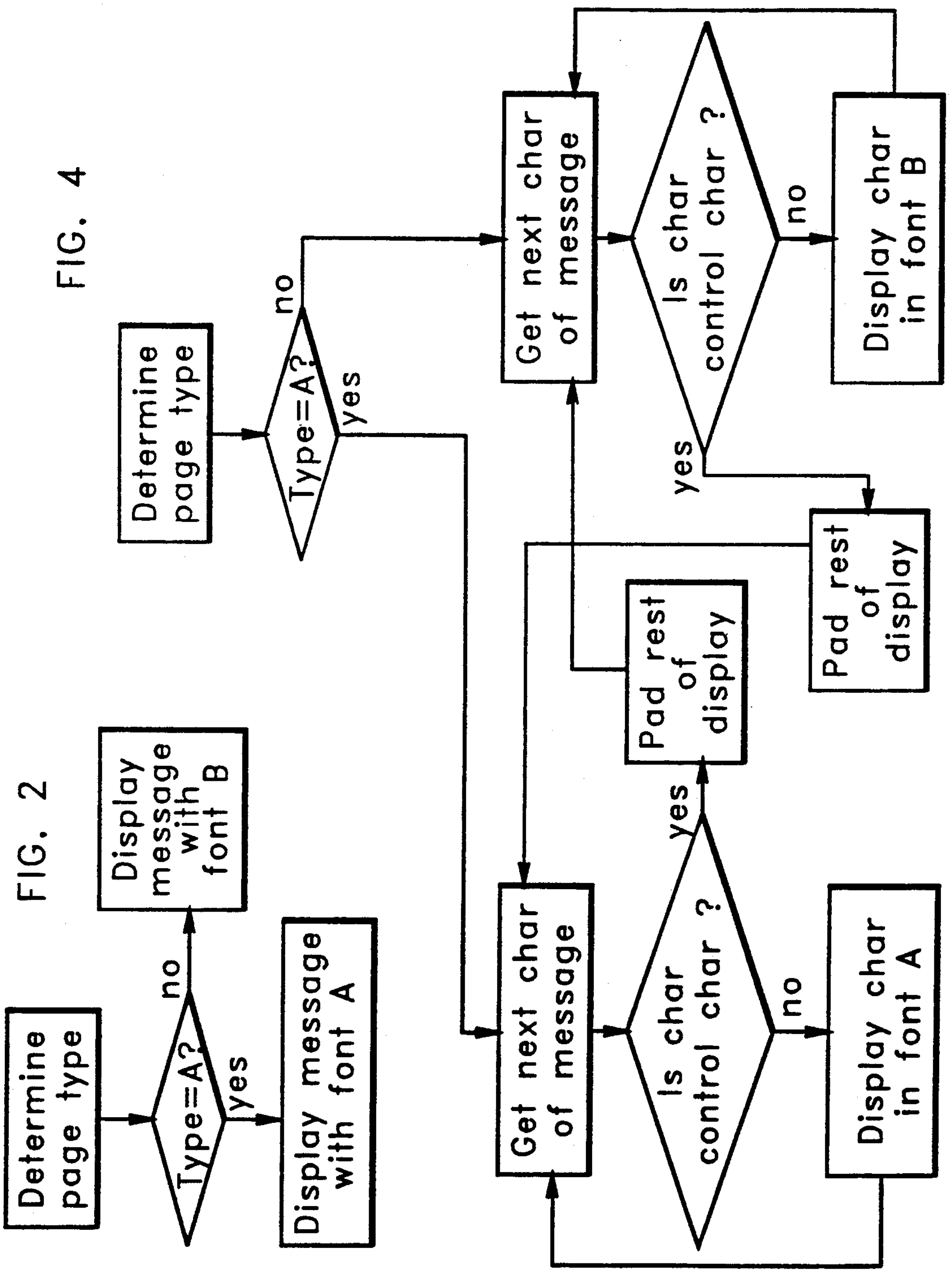
FIG. 2 is a flow chart illustrating a method of operation of the paging receiver in a first mode of operation.
FIG. 4 is a flow chart illustrating a method of operation of the paging receiver in a second mode of operation.
Figure 3A:
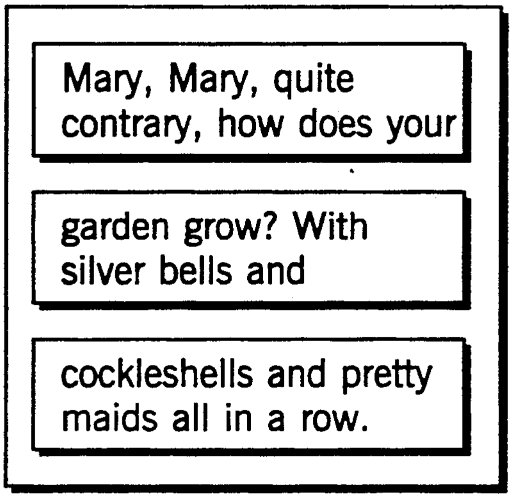
FIG. 3 shows examples of the display using the first mode of operation.
Figure 3B:
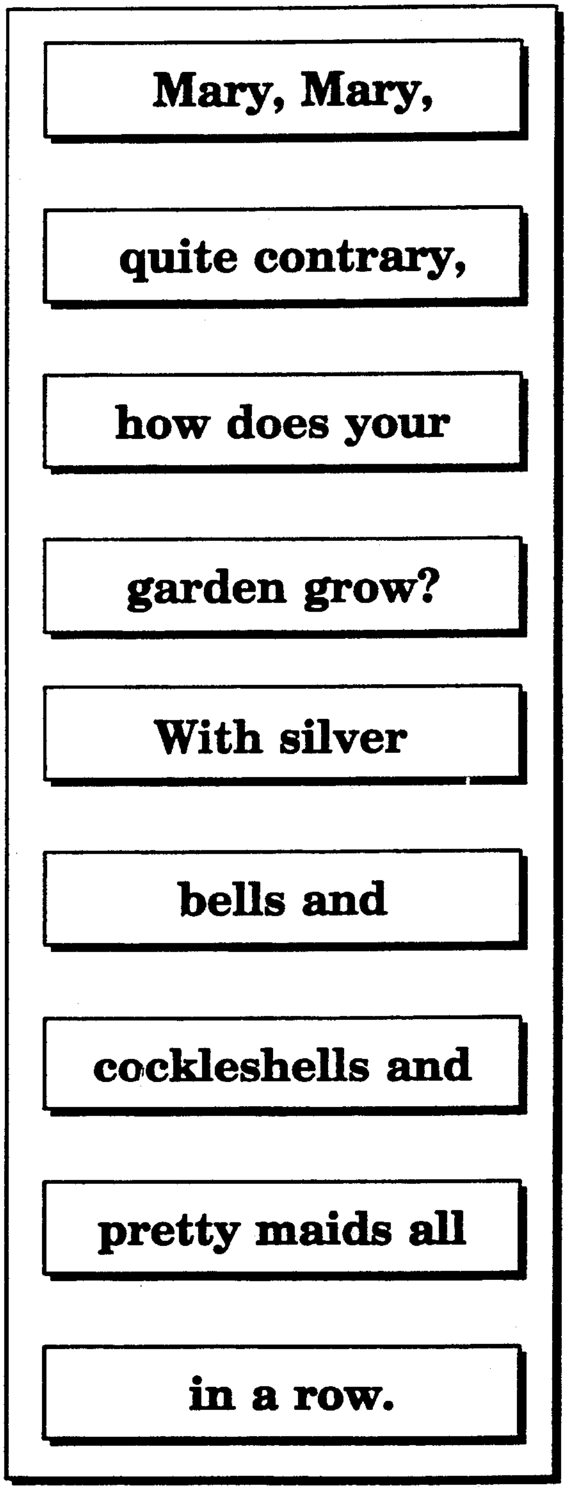

As shown in the flow diagram of FIG. 2, the microcomputer 10 determines at the beginning of a page, the type of script the message is to be displayed in. If the page type is type A, alphanumeric, then the message is displayed in Font A. If the page is not a type A, then the message is displayed in Font B. These two displays are shown in FIG. 3 where FIG. 3(*a*) shows the message displayed on consecutive display screens in Font A, alphanumeric 5×7 characters. In FIG. 3(*b*), Font B, alphanumeric 16×16 characters, are represented by bold type. It is clear that in Font A, there are two rows of characters per display, whereas in Font B, there is only one row.

Since the alphanumeric characters are only 5×7, it will be appreciated that less information need be sent in the data. The alphanumeric message can be sent in standard ASCII code requiring only 1 byte per character. An ideographic message which may be sent in one of a number of different standard codes, for example J.I.S. (Japanese Industrial Standard) code, requires 2 bytes. Thus, by identifying the page type at the start of the message, the optimum code can be used.

In the first operating mode, as described above, the font is chosen at the beginning of the message. However, there may be instances when a mixed alphanumeric/ideographic message needs to be sent. In this case, a second operating mode, as illustrated in FIG. 4 is used. In this case, as in the first operating mode, the page type is first determined to set the first font type. If it is required that the font be changed partway through the message, then a control character is sent in the message at the point when a change of font is desired. As shown in FIG. 4, each character of the message is checked to see whether it is such a control character. If it is not, then the character is displayed in the font presently being used. But if it is a control character, then it causes the font to be changed and the rest of the present display screen to be padded with blank characters in order to allow the new font to be displayed on a fresh screen. The next character is then checked, and, if it is not a control character, it is displayed on this fresh display screen in the new font.

Figure 5A:
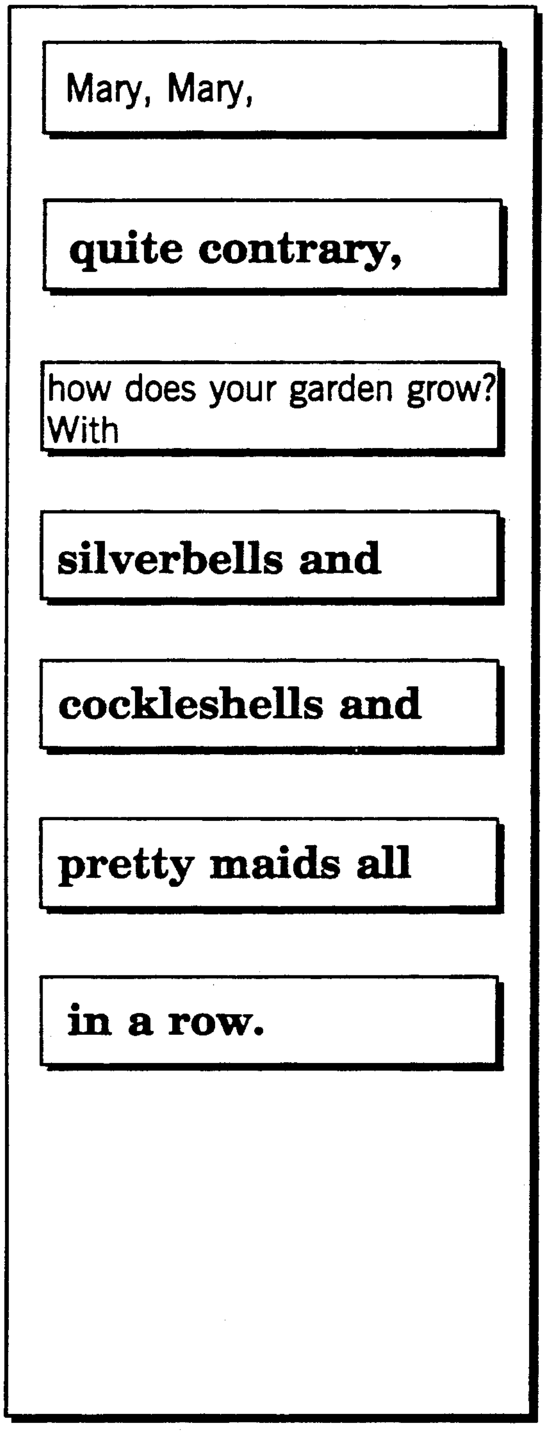
FIG. 5 shows examples of the display using the second mode of operation.
Figure 5B:
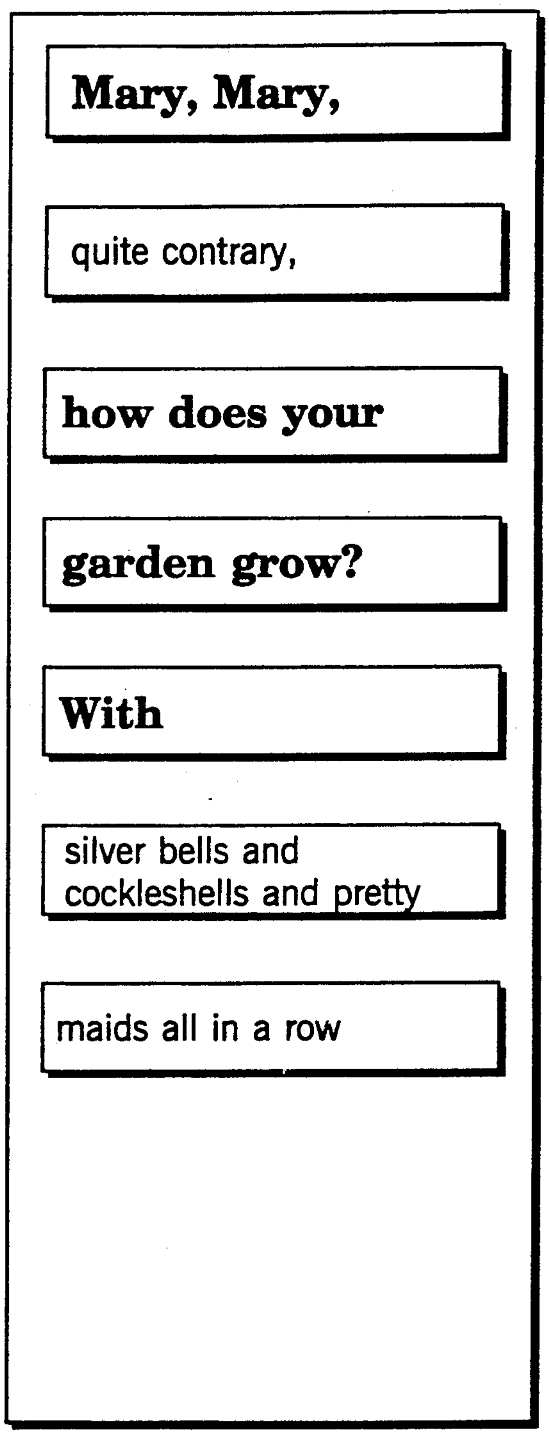

FIG. 5 (*a*) illustrates the sequence of display screens for an alphanumeric starting font (Font A). FIG. 5 (*b*) illustrates an alphanumeric starting font (Font B) where the following message is sent:

"Mary, Mary,^ quite contrary,^how does your garden grow? With ^ silver bells and cockleshells and pretty maids all in a row".

Where ^ is the control character sent in the message. Once again, the bold type in the figures represents the ideographic font.

Figure 6A:
FIG. 6 shows examples of alphanumeric and ideographic displays according to the invention.
Figure 6B:
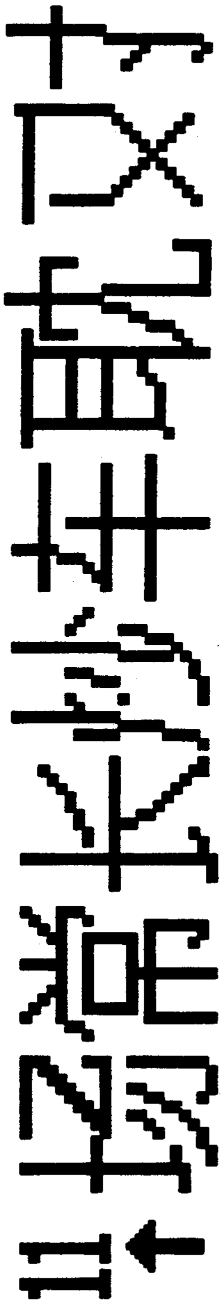
Figure 6C:
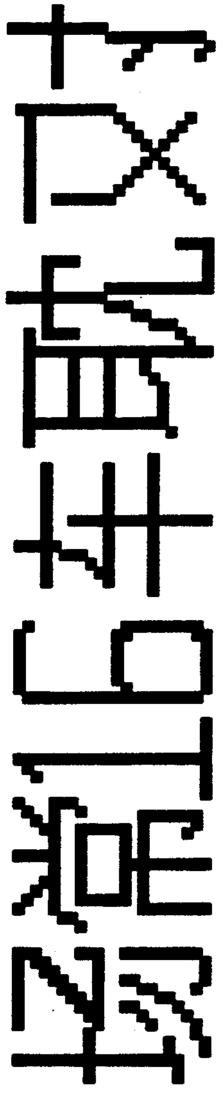

The above described second mode of operation has the disadvantage that it blanks off the rest of a display screen when a control character is received, even though there may be a substantial amount of display area still available on that screen. For example, if a message in ideographic script included one or two numerals in alphanumeric script in the middle of the message, then these two numerals would use a whole display screen by themselves. It would, of course, be possible to simply change from one font to the other without blanking off the display screens, but the large difference in size between the ideographic 16×16 characters and the alphanumeric 5×7 characters means that one or two 5×7 characters within a message composed mainly of 16×16 characters would be swamped and would not be easily viewed. FIG. 6 shows a display screen having in (a) only 5×7 characters in two rows and in (b) ideographic 16×16 characters with two alphanumeric 5×7 characters at the beginning thereof for comparison.

As is shown in FIG. 6(*c*), there is therefore provided a third Font C which comprises 8×16 alphanumeric characters. Such characters still only require 1 byte in ASCII format for transmission, but they are more clearly visible within a predominantly ideographic message than the 5×7 characters. It is, however, not desirable that large amounts of an alphanumeric message be displayed in these 8×16 characters since they require greater display area and hence greater battery energy than the 5×7 characters. Therefore, these 8×16 characters are only displayed if the amount of alphanumeric message is not enough to fill a display screen in 5×7 characters before reverting back to the ideographic 16×16 characters.

Figure 7:
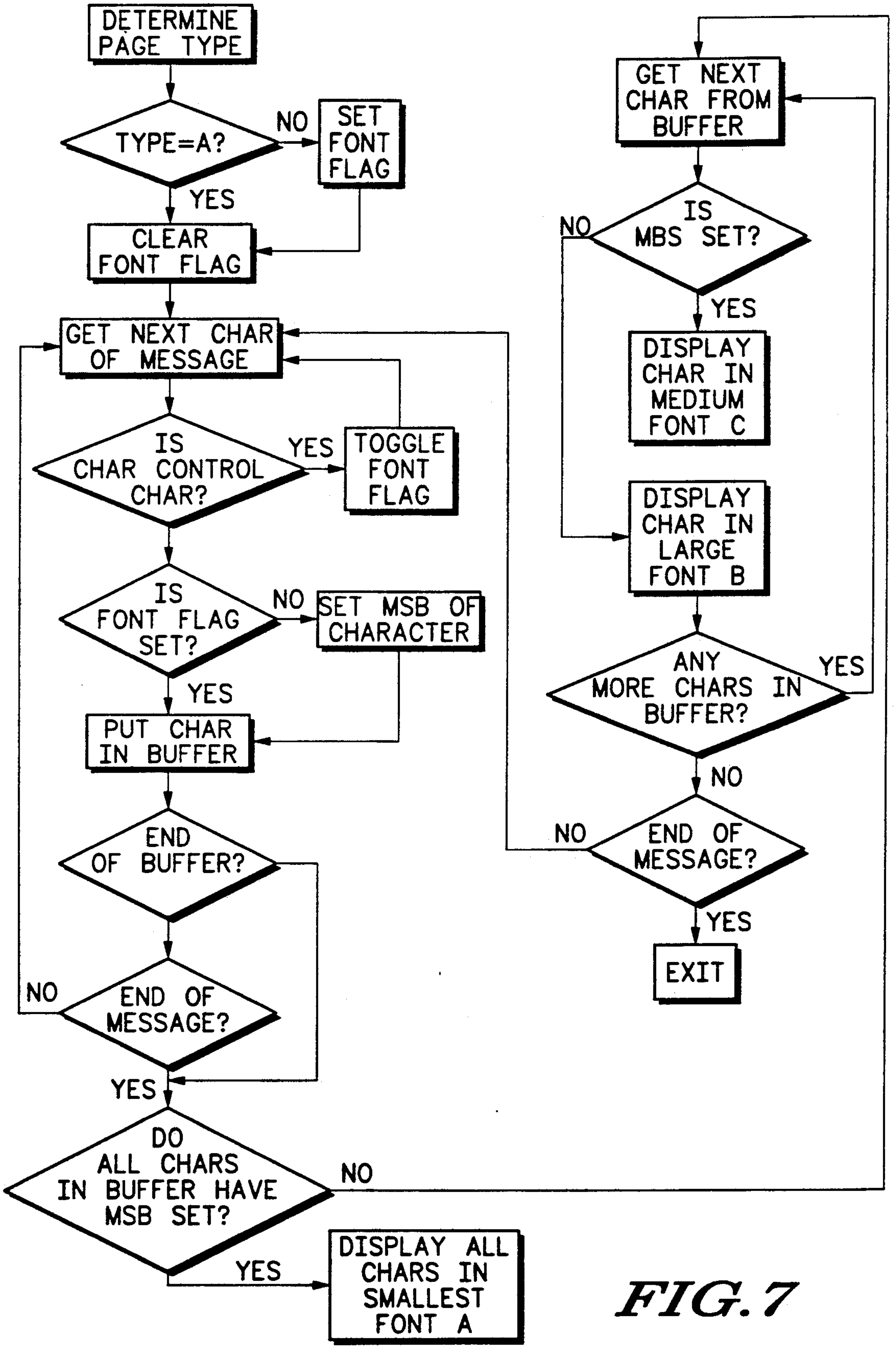
FIG. 7 is a flow chart illustrating a method of operation of the paging receiver in a third mode of operation.

This is shown in FIG. 7 where there is illustrated a flow chart for this third mode of operation. In this case, once again the page type is first determined. A font flag is set if it is determined that the message is to start in ideographic font B, and the flag is cleared if the message is starting in alphanumeric. The next character in the message is then checked. If it is a control character, then the font flag is toggled. If the character is not a control character, then the character is put in a buffer along with a label indicating it is an alphanumeric character, if the font flag is not set. As long as the buffer, which is of a size which will store sufficient characters to fill up a display screen in 5×7 characters, is not full, this process continues. As soon as the buffer is full however, the characters therein are checked. If they all have a label, i.e. they are all alphanumeric characters, then they are displayed in the 5×7 alphanumeric font A. If however, they are not all labelled as such, then each character is taken in turn and displayed in either the 16×16 ideographic font B or the 8×16 alphanumeric font C. Once all the characters in the buffer have been displayed, the next character in the message is checked and the process is repeated.

It will also, of course, be apparent that the receiver can be provided with a switch operable by the user which prevents the 5×7 alphanumeric font from being selected. This may be useful when the receiver is being used by someone who has difficulty in seeing the smaller script and would prefer all alphanumeric characters to be displayed in the larger 8×16 character font.

Figure 8A:
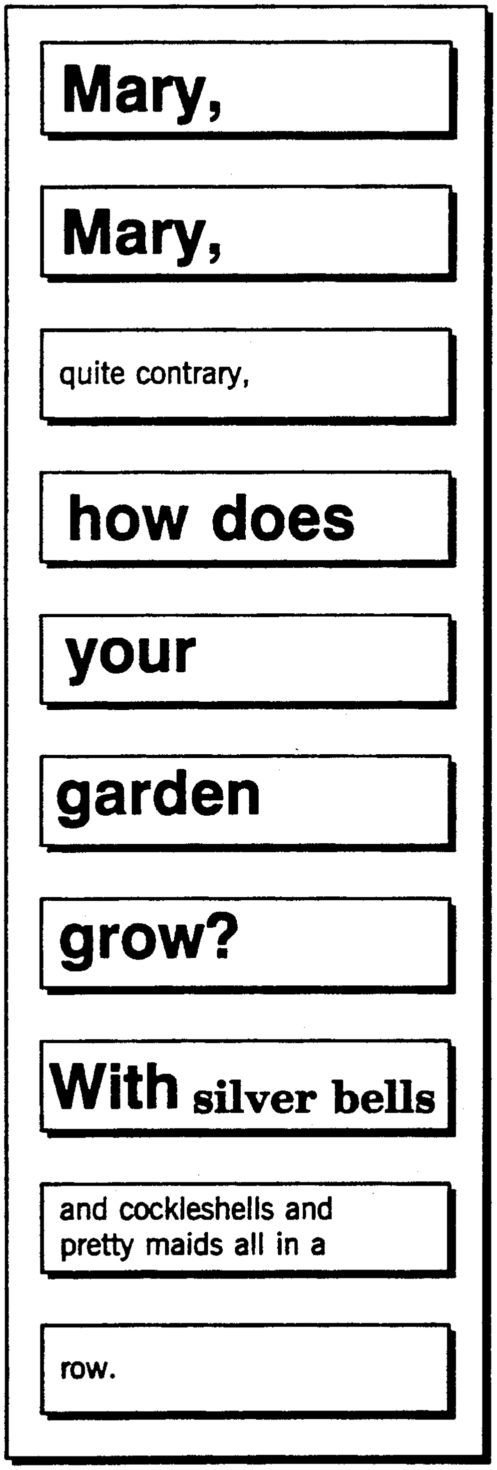
FIG. 8 shows examples of the display using the third mode of operation.
Figure 8B:
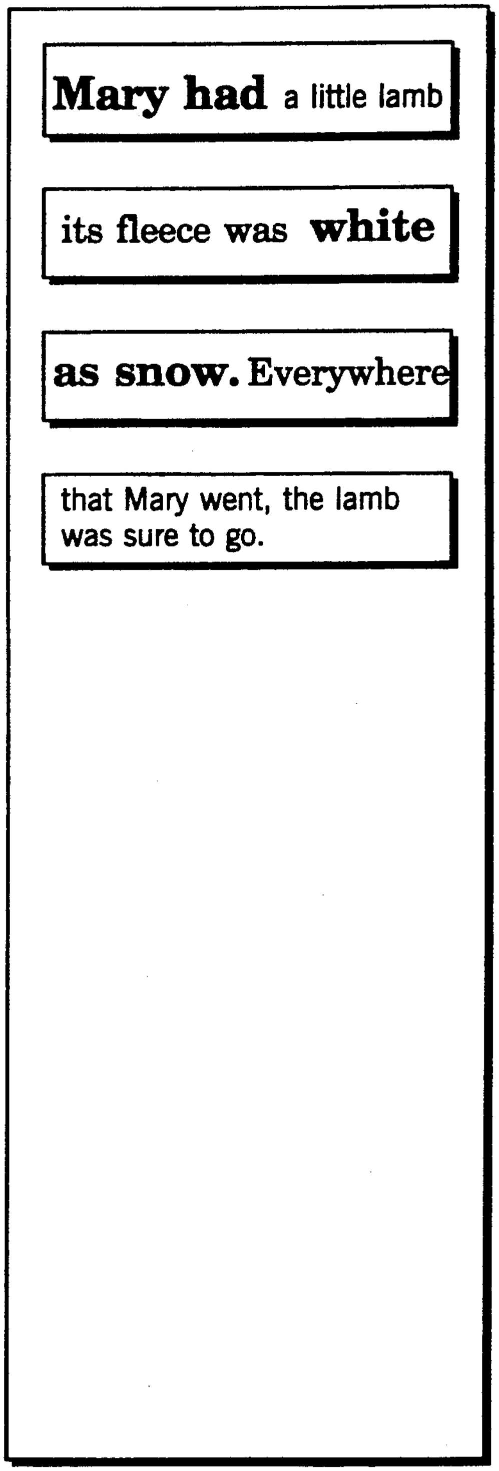

FIG. 8 illustrates the sequence of display screens for all three fonts. FIG. 8 (*a*) illustrates the message as follows:

Mary, Mary, ^quite contrary,^ how does your garden grow? With^ silver bells and cockleshells and pretty maids all in a row.

FIG. 8 (*b*) illustrates the message as follows:

Mary had^a little lamb its fleece was^white as snow. Everywhere that Mary went, the lamb was sure to go.

By now it should be appreciated that there has been provided an improved selective call receiver capable of displaying messages comprising a plurality of different scripts.

We claim:

1. A selective call receiver capable of displaying messages in first, second, and third scripts comprises:

receiving means for receiving data including an address and a message to be displayed;

decoding means for decoding said received data and recognizing at least one script select character within said received data;

memory means for storing at least two fonts corresponding to said scripts and having different resolutions, said first, second, and third scripts comprising first alphanumeric, second alphanumeric and ideographic scripts wherein said memory means stores an ideographic font, a first alphanumeric font, and a second alphanumeric font, said ideographic font utilizing a greater amount of display area than said first alphanumeric font;

control means coupled to said decoding means and said memory means for selecting one of said fonts in response to the at least one script select character; and display means coupled to said control means for displaying said message in the fonts and wherein said alphanumeric font is selected by said control means when the font being displayed is said ideographic font and a script select character is received, provided that the amount of message remaining to be displayed before the next script select character is not enough to fill the display area in said first alphanumeric font.

2. A selective call receiver capable of displaying messages in first and second scripts comprising:

receiving means for receiving data including an address and a message to be displayed;

decoding means for decoding said received data and recognizing at least one script select character within said received data;

memory means for storing at least two fonts corresponding to said first and second scripts and having different resolutions, said first and second scripts comprising a first alphanumeric and ideographic scripts wherein said memory means stores an ideographic font and a first alphanumeric font, said ideographic font utilizing a greater amount of display area than said first alphanumeric font;

control means coupled to said decoding means and said memory means for selecting one of said fonts in response to the at least one script select character;

display means coupled to said control means for displaying said message in the two fonts; and buffer means for storing a part of the message about to be displayed by said display means, whereby the control means only selects said first alphanumeric font if there is a sufficient amount of said message to be displayed before the next script select character to fill the display area of the display means in said first alphanumeric font.

3. The selective call receiver according to claim 2 wherein said control means selects a second alphanumeric font if the amount of message to be displayed before the next script change character is not sufficient to fill the display area in said first alphanumeric font.

4. In a selective call receiver, a method of displaying a message in two or more fonts, comprising the steps of:

receiving data including a message to be displayed and at least one select character;

recognizing said at least one select character;

selecting one of a plurality of fonts in response to said select character, wherein the fonts comprise an ideographic font, a first alphanumeric font and a second alphanumeric font having a resolution between that of the first alphanumeric font and the ideographic font;

displaying a first portion of said message in said selected font and a second portion of said message in another one of said fonts, said fonts having different resolutions;

determining whether a portion of the message between successive select characters to be displayed in alphanumeric font is sufficient to fill up a display screen in the first alphanumeric font; and selecting either the first or second alphanumeric fonts according to whether there is or is not, respectively, sufficient message to fill up a display screen in the first alphanumeric font.

5. A selective call receiver comprising:

means for receiving data including a first font select character and a message to be displayed containing at least a second font select character;

means for decoding said received data and for recognizing said font select characters;

means for storing an ideographic font of a first size, a first alphanumeric font of a second size and a second alphanumeric font of a third size said first size being larger than said second size, and said second size being larger than said third size;

means for selecting either the ideographic font, the first alphanumeric font or the second alphanumeric font for the first portion of the message and for alternatively selecting one of said ideographic and alphanumeric fonts for successive positions of the message each time said font select character is recognized;

means for determining whether a portion of the message between successive font select characters to be displayed in an alphanumeric font is of sufficient size to fill up a screen of a display means in said second alphanumeric font of said third size;

means for selecting said second or third alphanumeric fonts according to whether the portion of the message is of sufficient size to fill up the display screen in the third size font, respectively; and means for displaying successive portions of the message on a display screen in the respective fonts selected wherein portions of the message to be displayed in said second alphanumeric font of the third size are always displayed on fresh screens.

* * * * *